FIG_2

United States Patent Office 3,121,980
Patented Feb. 25, 1964

3,121,980
AUTOMATIC CHAMFERING MACHINE
Charles N. Menz and John B. Clancy, Troy, N.Y., assignors to The Bendix Corporation, Troy, N.Y., a corporation of Delaware
Filed Aug. 8, 1962, Ser. No. 215,629
5 Claims. (Cl. 51—124)

The present invention relates to a new and improved machine for removing material from the ends of work pieces or blanks; and more particularly to a machine for chamfering the ends of arcuately formed pieces of brake lining.

The principal object of the present invention is the provision of a new and improved machine which can be used to provide various degrees and angles of chamfer on work pieces of a variety of diameters and arcuate lengths by the mere changing of a few of the parts of the machine, and without requiring a complicated readjustment of the parts of the machine during change-over or set up to handle a different size of lining from that which it previously handled.

The machine can be used to chamfer strip materials other than brake lining, and can be used to perform types of machining other than chamfering; so that further objects and advantages will occur to those skilled in the art to which the invention relates from the following description of the preferred embodiment described with reference to the accompanying drawings which form a part of the specification, and in which:

While the invention may be otherwise embodied, it is herein shown and described as embodied in a machine for chamfering the ends of the arcuate segments of organic brake linings that are used in the conventional drum type brakes of automotive vehicles. It will be understood that automotive drum type brakes are made in a variety of diameters and widths—both of which may vary with each make and model of automotive vehicle that is produced commercially. The brake linings which are used in the various diameters and widths of brake structures may also vary in length; and all of the various sizes of brake linings must have their ends chamfered before being assembled in position in their corresponding brake structures. Inasmuch as a large variety of brake lining sizes must be made, it is uneconomical to design a separate machine to handle or chamfer individual sizes of brake linings. It will be appreciated that a considerable problem exists in the design of a single machine for handling the many various sizes and diameters of linings in a manner which will involve a minimum of set-up time, or conversion time between runs of various diameters and sizes. A further problem exists in that the lining of the various sizes must be chamfered at angles that may vary one from another, and may further vary as to the depths of chamfer required by the various linings.

Figure 3:
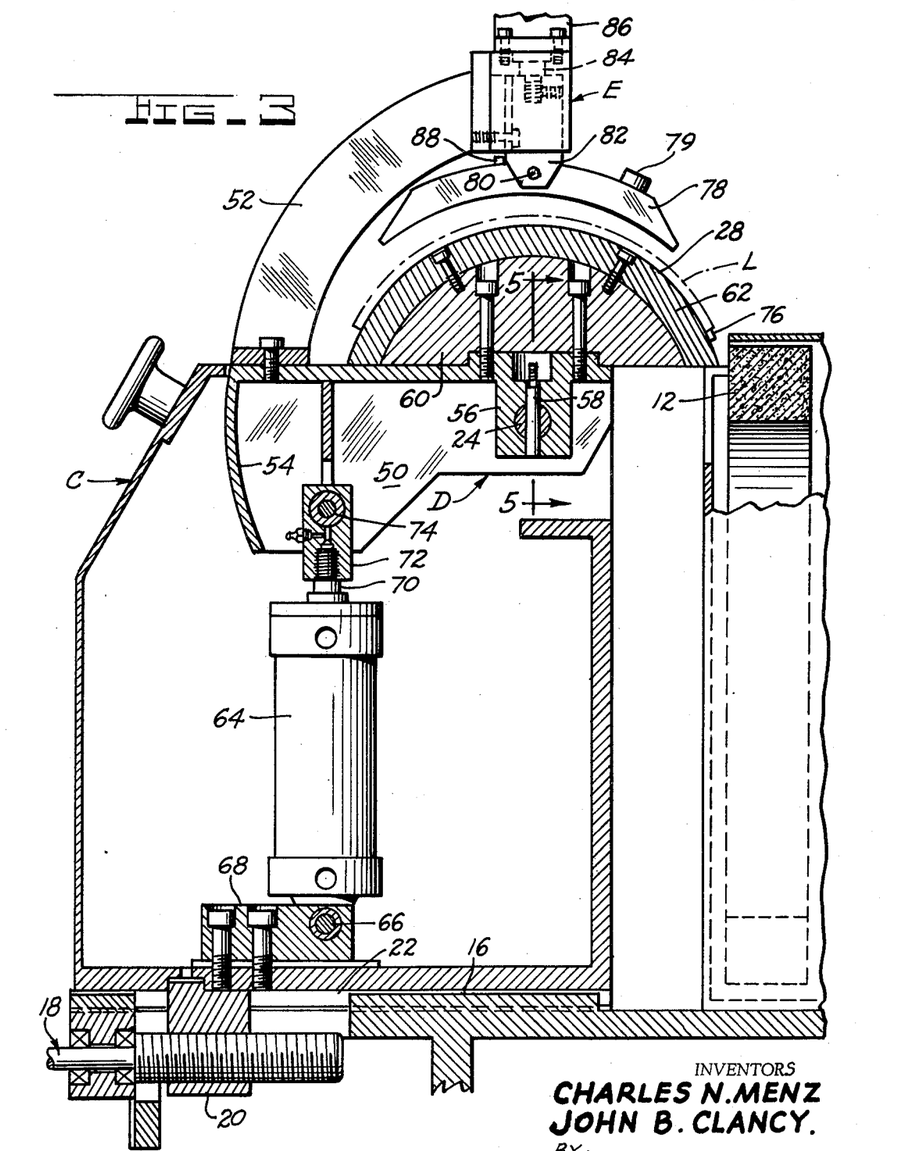
FIGURE 3 is a fragmentary cross sectional view taken approximately on the lines 3—3 of FIGURE 1 to better illustrate the mechanism for clamping and feeding the pieces of brake lining up against the grinding wheel.

The brake lining chamfering machine shown in the drawing generally comprises an L-shaped bed or frame A having its horizontal leg extending forwardly, and its vertical leg positioned to the back side of the machine. A forwardly extending horizontal shaft 10 suitably journalled in the upright portion of the frame A to rotatably drive a suitable machine tool B, which in the present instance is an annular grinding wheel 12 that rotates in a vertical plane over the horizontal leg of the frame A. A stout triangular shaped bracket 14 is mounted on the front face of the frame A for the purpose of supporting the front end of a forwardly and rearwardly extending guideway 16 which extends rearwardly over the horizontal leg of the frame A, and is generally perpendicular to the front end surface of the grinding wheel 12. A movable table or carriage C is suitably mounted on the guideway 16 for movement toward and away from the front annular surface of the grinding wheel 12. The table C is adapted to be accurately positioned with respect to the front face of the grinding wheel 12 by means of a suitable lead screw and hand wheel generally designated at 18. The manner in which the lead screw 18 actuates or moves the table C is best seen in FIGURE 3, where it can be seen that the threaded portion of the lead screw 18 is received in a lead nut 20 that extends upwardly through a suitable slot 22 in the guideway 16 and is suitably bolted to the bottom surface of the table C.

The table C serves the general function of rotatably journalling a horizontal transversely extending tilt or rock shaft 24 (best seen in FIGURES 3, 4, 5 and 6) in the upper rear portion of the table C just forwardly of the grinding wheel 12. The table C is relatively tall and narrow and a pair of suitable anti-friction bearings 26 are mounted adjacent opposite sides of the carriage for the support of the rock shaft 24. A work support generally indicated at D having an upper arcuately shaped work supporting surface 28 is suitably fastened to the rock shaft 24 so that sections of brake linings that are placed upon the work supporting surface 28 may be fed endwise into engagement with the front annular surface of the grinding wheel 12 by means of a tilting or rocking action of the horizontal rock shaft 24. Suitable clamping means E are mounted on the work support D to securely hold arcuate sections L of lining (generally indicated by the dot-dash lines in FIGURE 3) down upon the upper arcuate surface 28 of the work support D during rocking action of the work support D. The machine is generally completed by means of feed mechanism F that includes a stationary arcuately shaped loading surface 30 that is identical in contour to the support surface 28, and is positioned to the right side of the work support D. Linings that are placed on the arcuately shaped loading surface 30 are sequentially slid into position upon the work supporting surface 28 by means of an arcuately shaped pusher plate 32 that conforms to the shape of the loading surface 30 and which is normally positioned to the right side of the loading surface 30 by a distance which exceeds the maximum width of the linings to be handled by the machine.

The lining segments, or work pieces L, are fed onto the loading surface 30 by means of a generally horizontal magazine type feed G which generally comprises an inclined roller conveyor section 34 upon which the lining segments L are laid on their side, and an arcuately shaped guide section 36 which transfers the linings from the roller conveyor section 34 to a vertical position down upon the loading surface 30. The inner side plate 38 of a magazine guide section 36 is supported vertically away from the loading surface 30 by a distance slightly greater than a thickness of the lining so that the lining segments which rest upon the bottom segment are held in place as the pusher plate 32 slides the bottom segment out from under the rest of the lining segments which are retained within the arcuate shaped guide 36.

Any suitable reciprocating mechanism can be used to move the pusher plate 32 from its right hand, or normal position beneath the magazine feed G, to slide the bottom lining segment out from under the remaining lining segments in the magazine section, onto the work supporting surface 28 of the work support D. In the preferred embodiment shown in the drawing, a double acting air cylinder 40 is mounted on the upper surface of a horizontal bracket 42 that is mounted on the right hand side of the feed table C in line with the pusher plate 32; and a horizontal groove or guideway 44 is provided across the loading surface 30 to adequately support and guide a reciprocating head 46 that is suitably fastened to the piston rod 48 of the air cylinder 40. A filler plate 50 is suitably positioned between the reciprocating head 46 and a pusher plate 32 for reasons which will later be explained; and the pusher plate 32, filler plate 50, and reciprocating head 46 are suitably fastened together by means of suitable machine screws.

The work support D, previously mentioned, has a width measured along the axis of the tilt shaft 24 which is only slightly larger than the maximum width of lining that is intended to be handled by the machine. The work support D is formed by means of lower, intermediate, and upper sections, whose purpose will later be explained. The lower support member 50 of the work support D is a weldment of the aforementioned width that is positioned about the rock shaft 24 and extends both forwardly and rearwardly thereof, with the larger portion of the member positioned forwardly of the rock shaft 24. An arcuate bracket 52 is bolted to the front portion of the support member 50, and the arcuate bracket 52 extends up and over the rock shaft 24 to support the clamping means E. The front face of the lower support weldment 50 is also provided with a depending cylindrical section 54 which acts as a guard during rocking action of the weldment 50 to prevent foreign objects from becoming wedged between the top surface of the table C and the under surface of the rocking weldment 50. The weldment 50 includes a solid block of metal 56 which surrounds the rock shaft 24 and which is securely fastened thereto by means of a tapered pin 58. In order that the work support D can be made to accommodate linings of various diameters, the work support D has an intermediate section or block 60 that is formed as a segment of a cylinder for the purpose of receiving one of a plurality of outer cylindrical sections 60 which are individually formed for each radius of lining which the machine is to handle. The work supporting surface 28 is provided by the outer surface of the upper cylindrically shaped section 62 of the work support and is suitably fastened to the top surface of the arcuate intermediate section 60 in such manner that it can be readily removed or changed when the machine is to be set up to handle a different diameter lining.

The work support D may be rocked or tilted from its normal horizontal position, best seen in FIGURE 3, to a downwardly and rearwardly inclined position wherein a lining segment supported on its supporting surface 28 is brought endwise into engagement with the front face 12 of the grinding wheel. The work support D may be rocked by means of any suitable mechanism; and as shown in the drawing, is acuated by means of a double acting air cylinder 64, the cylinder portion of which is suitably pivoted as by means of a pin 66 to a bracket 68 that is suitably fastened to the lower surface of the table C, and the piston rod 70 of which is suitably threaded into a swivel block 72 that in turn is pivotally connected to the weldment 50 as by a pin 74.

In order that the lining segments L can be consistently and accurately chamfered by the machine, the lining segments L must be placed accurately in a predetermined position upon the work support D prior to being fed into engagement with the grinding wheel 12. According to principles of the present invention this is accomplished by means of the clamping means E when working in conjunction with suitable stop means or abutment means located on the work support D, and against which the linings are positioned. The stop means shown in the drawing comprises a relatively small stop plate 76 that extends across the portion of the surface 28 adjacent the grinding wheel 12. The clamping means E comprises an arcuate holddown shoe 78 which is pivoted adjacent its center section as at 80 to a swivel block 82 that is suitably fixed to the piston rod 84 of a double acting air cylinder 86 that is supported by means of the previously mentioned arcuate bracket 52. The pin 80 extends across the shoe 78 generally parallel with the rock shaft 24, and the rear half of the shoe 78 is so weighted by means of weight 79 that it is normally caused to take a position closer to the lining segments L than is the front half of the shoe 78. A suitable means is provided as by the abutment lug 88 which engages with the front side surface of the swivel block 82 for limiting the downward movement of the rear portion of the holddown shoe 78. During a clamping action of the holddown means E, the rear portion of the shoe 78 produces the initial contact with the lining section L as the holddown shoe 78 is moved downwardly upon the lining section L to thereby produce a slight rotation of the holddown shoe 78 which slides the lining section L rearwardly into tight engagement with the stop plate 76. This shifting of the lining segment is produced automatically by the initial clamping action of the holddown means E, and avoids a separate lining positioning operation during the functioning of the machine. In some instances it will be desirable to locate the stop means 76 to other locations on the work support D as for example adjacent the front edge of the supporting surface 28. Where the latter is done, the weighted portion of the shoe 78 would be positioned on the front side of the pin 80 so that the lining segment L would be positioned by the opposite edge from the one being chamfered. With this latter described arrangement, it is possible to chamfer the lining segments L to exact arcuate lengths.

Figures 5, 6:
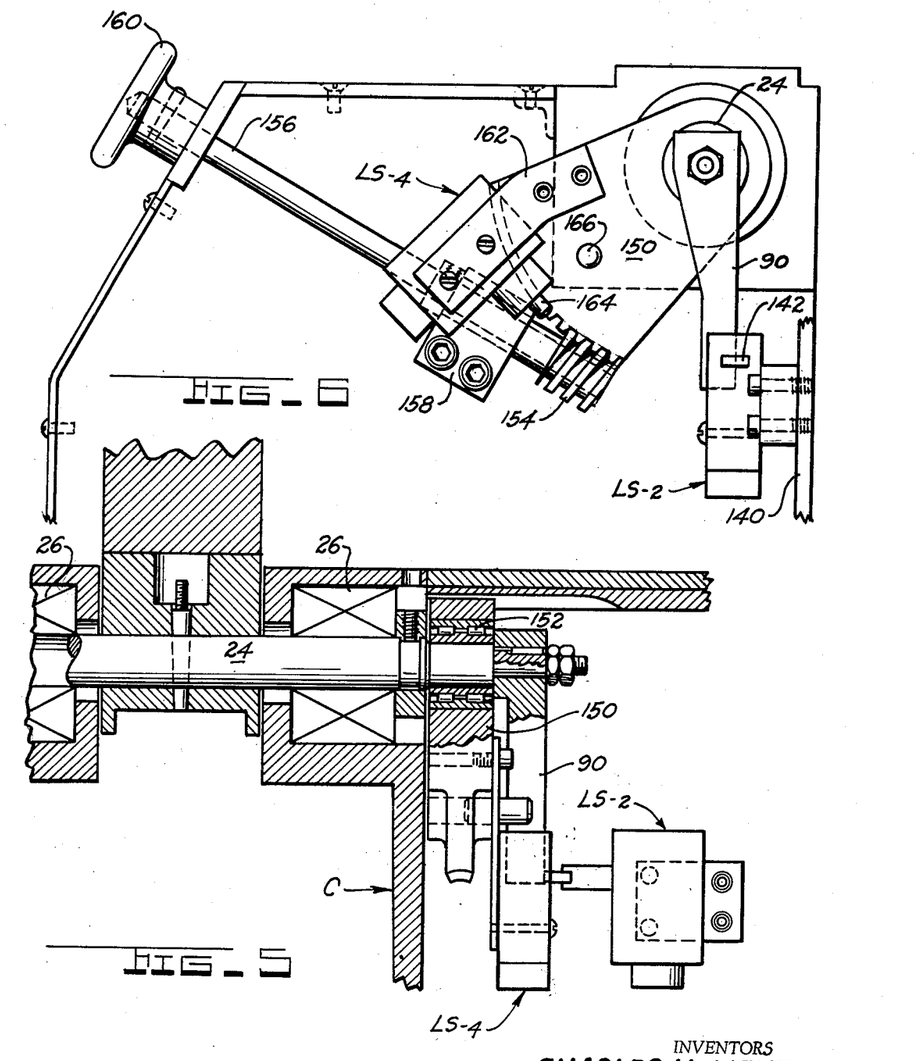
FIGURE 5 is an enlarged fragmentary sectional view taken approximately on the line 5—5 of FIGURE 3 to better illustrate the mechanism used to move the pieces of brake lining against the grinding wheel, and to better illustrate the means for controlling this movement.
FIGURE 6 is an enlarged fragmentary view taken approximately on the line 6—6 of FIGURE 1, and in general is a right hand view of the elements seen in FIGURE 5 to better illustrate the means used for controlling the rocking movement of the feed mechanism seen in FIGURES 3 and 5.

Control of the rocking action of the work support D may be had in any suitable manner; and may be conveniently accomplished as shown in the drawing by means of a depending dog or lug 90 that is suitably keyed to the projecting end of the rock shaft 24 (best seen in FIGURES 5 and 6 of the drawings). Dog 90 is shown positioned on the right hand end of the rock shaft 24 and adjustable means are provided for sensing its position which of course is directly related to the position of the work support D.

As previously mentioned, actuation of the work support D, clamping means E, and feed mechanism F can be had in any suitable manner, as for example hydraulic cylinders, electrical solenoids, gear trains etc., and as shown in the drawings are very conveniently controlled by means of air cylinders which are fast acting and provide a slight cushioning effect. Sensing of the position of the various moving parts of the machine and particularly the work support D can be had by a variety of means and in the preferred embodiment shown in the drawing is had by means of the dog 90 and suitable limit switches.

Figure 7:
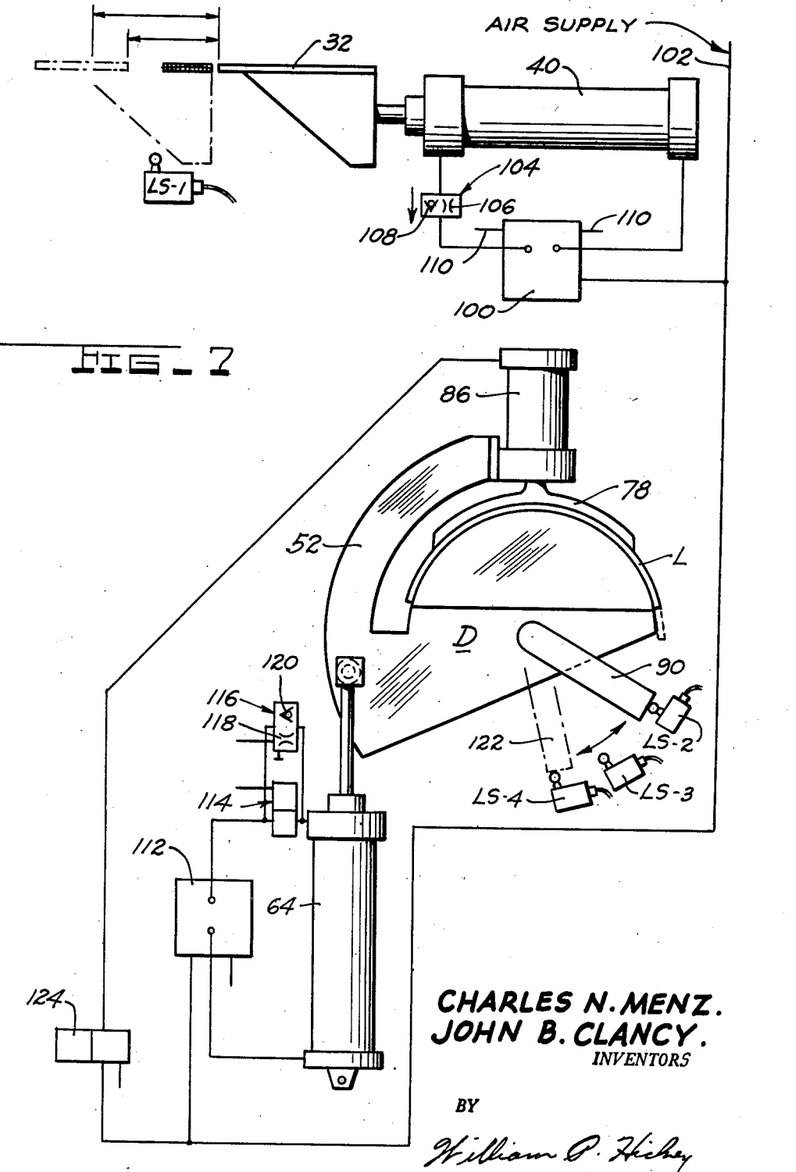
FIGURE 7 is a schematic diagram of certain elements of the machine which controls the loading of the brake linings into the machine, and the movement of the brake linings through their chamfering operation.

An understanding of the control of the various feeding motions that are involved in the present machine can best be had by referring to the schematic control diaphragm shown in FIGURE 7. Control of the movement of the pusher plate 32 that is used to transmit individual segments from the magazine feed G to the work support D is had by means of a four-way solenoid operated air valve 100. In the normal deenergized condition of the solenoid valve 100, it supplies air to the left side of the feed cylinder 40 to hold the pusher plate in its retracted position. When the machine's start button is pushed, the solenoid valve 100 is energized to communicate air pressure to its right side to cause the pusher plate 32 to force a lining segment out of the magazine G onto the work support D. During this feed stroke, exhaust air from the left side of the cylinder is caused to flow through a restriction 106 to produce a slow controlled feed stroke. When the pusher plate 32 has advanced a segment from the magazine G to its proper position in the feed means D, it contacts normally closed limit switch LS–1 to deenergize solenoid valve 100 and introduce pressure from the air supply main to the left side of the air cylinder 40. Communication between the left side of the cylinder 40 and the appropriate port of the four-way valve 100 is had by means of an auxiliary valve 104 which incorporates both a restriction 106 for flow in either direction and a check valve 108 arranged to prevent exhaust flow from the left side of the cylinder 40 but which will permit rapid pressure flow to the left side of the cylinder to produce rapid withdrawal of the pusher plate 32. It will be understood that exhaust flows from either side of the air cylinder 40 will pass out through one of the appropriate exhaust ports 110 to the atmosphere.

The feed stroke of the lining which forces it against the grinding wheel 12 is of course produced by the air cylinder 64. When the limit switch LS–1 is opened by the engagement of the pusher plate mechanism 32, the four-way solenoid valve 112 which controls the actuation of the air motor 64 is energized to dump air into the bottom side of the air motor 64, and thereby produce a rocking action of the work support D toward the grinding wheel. Exhaust flow out of the top side of the air motor 64 is controlled by means of an auxiliary solenoid shut-off valve 114 and an auxiliary by-pass valve 116 for controlling flow around the auxiliary shut-off valve 114. The auxiliary by-pass valve 116 is similar to the auxiliary valve 104, and includes a restriction 118 against flow in either direction, as well as a check valve 120 adapted to prevent fast flow therethrough outwardly of the air motor 64.

When the limit switch LS–2 is contacted by the dog 90, to sense the normal vertical position of the work support D, the actuation of the limit switch LS–1 by the pusher plate mechanism 32 energizes the solenoid valve 112 to introduce air pressure to the bottom of the air motor 64 as above described. At the same time the auxiliary shut-off valve 114 remains normally open to permit the rapid exhausting of air from the upper end of the air motor 64 out through the solenoid valve 112 to the atmosphere until a dog 122 identical with the dog 90 but positioned on the left side of the rock shaft 24 moves into engagement with the limit switch LS–3 to cause an energization of the auxiliary solenoid shut-off valve 114 and thereby cause all exhaust flow thereafter to proceed through the restriction 118. The feed stroke of the lining segments L against the grinding wheel 12 is therefore divided into an initial rapid travel portion, followed by a slow feed portion during which the lining segment engages the grinding wheel. The extent of the feed and amount of chamfer that is produced thereby is controlled or limited by a limit switch LS–4 which is adjusted to be contacted by the dog 90 at a predetermined limit of travel of the work support D. At contact, the limit switch LS–4 is actuated to cause a reversal of the solenoid valve 112, and a simultaneous opening of the auxiliary solenoid valve 114 to permit air pressure to be rapidly communicated to the top side of the air motor 64 to thereby produce a rapid return of the work support D to its normal vertical position. Actuation of limit switch LS–4 by the extreme limit of movement of the dog 90 simultaneously produces a de-energization of the three-way solenoid valve 124 which causes it to dump air pressure out of the top side of the clamping air motor 86. The air motor 86 is spring biased to its upper position to unclamp the lining segment L from beneath the clamping shoe 78; so that when the work support D reaches its normal vertical position and the limit switch LS–2 is contacted by the dog 90, the limit switch LS–2 energizes the solenoid 100 to cause the pusher plate 32 to push a new blank into position on the work support D and simultaneously force the chamfered segment out of the machine to thereby start another cycle of the mechanism.

Figure 4:
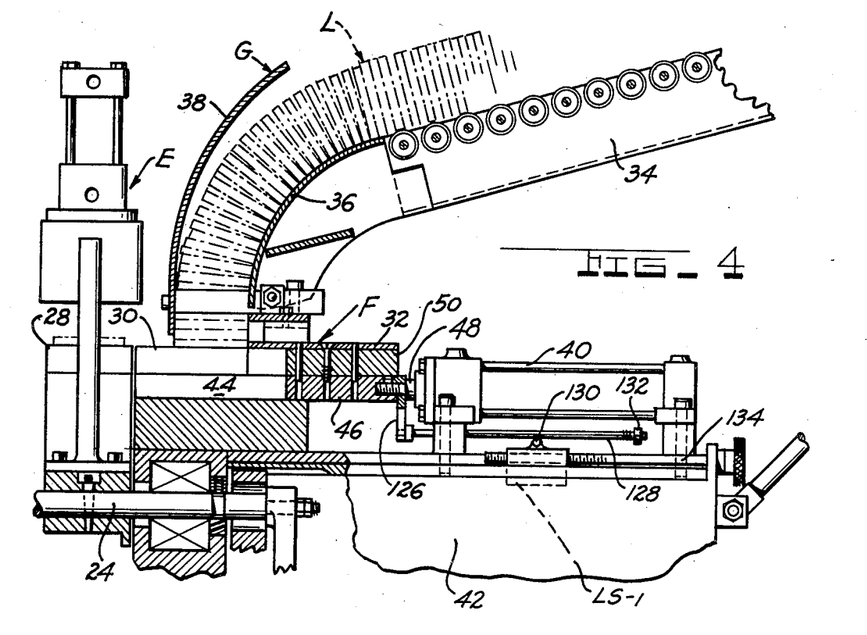
FIGURE 4 is a fragmentary cross sectional view taken approximately on the line 4—4 of FIGURE 2 to better illustrate the manner in which unmachined blanks of brake linings are fed into the machine.

The physical location of limit switch LS–1 is best seen in FIGURE 4 wherein it is shown mounted by means of a horizontal lead screw that projects from the right side of the frame of the machine and which is adapted to position the limit switch LS–1 generally parallel with the axis of the air motor 40. The reciprocating head 46 that is attached to the piston rod 48 of the air motor 40 is provided with a depending leg 126 which in turn supports a horizontal rod 128 that also extends lengthwise of the cylinder 40 and passes over the top surface of the limit switch LS–1. The limit switch LS–1 is provided with a roller which, in the normal open position of the limit switch LS–1 just rides clear of the horizontal rod 128. A threaded stop 132 is mounted on the rod 128 to contact and close the switch LS–1 at the end of the feed stroke.

The limit switch LS–2 is best seen in FIGURES 5 and 6 of the drawings and is physically mounted to the frame of the machine in a position to be engaged by the right rear surface of the dog 90.

The limit switch LS–3, which is schematically shown in FIGURE 7, is physically mounted on the left side of the table C for appropriate contact with a dog 122. The dog 122 is mounted on the opposite end (left side) of the rock shaft 24 from the dog 90 and is adjustably positioned by a gear section and worm gear in a manner generally opposite hand to the limit switch LS–4 about to be described.

The limit switch LS–4 is mounted on a gear sector 150 which is rotatably journalled about the right hand projecting end of the shaft 24 by means of an anti-friction bearing 152. The outside thread of the gear sector 150 is engaged by a worm gear 154 that is supported on the rear end of a control shaft 156 that is inclined upwardly and forwardly along the right side of the table C. The control shaft 156 is rotatably supported by bracket 158 and projects outwardly of the inclined controlled face of the table C. The shaft 156 is provided with a suitable hand wheel 160 by which the shaft is physically rotated to turn the worm gear 154 and thereby position the gear sector 150 angularly with respect to the axis of the tilt shaft 24. The limit switch LS–4 is mounted on the gear sector 150 by means of an appropriate bracket 162 in such a position that its control button 164 is contacted by the outer face of the dog 90. In order to prevent damage to the limit switch LS–4, an abutment pin 166 is provided on the gear sector 150 in a position to be contacted by the dog 90 just after the time that the switch LS–4 is closed by the dog 90. As previously mentioned, the switch LS–3 is mounted in a similar manner to that described for the limit switch LS-4 excepting that the limit switch LS-3 is of a roller type corresponding to the switch LS-2 so that it is closed as the front face of the dog 122 is rotated past the limit switch LS-3. A hand wheel 168 is mounted on the left side of the table C in an identical manner with that described for the hand wheel 160 and is used to adjust the position of the limit switch LS-3. The limit switch LS-3 becomes closed, and the fast rocking feeding action of the work support D is terminated at a position of the lining segment just before its contact with the grinding wheel 12.

Figure 2:
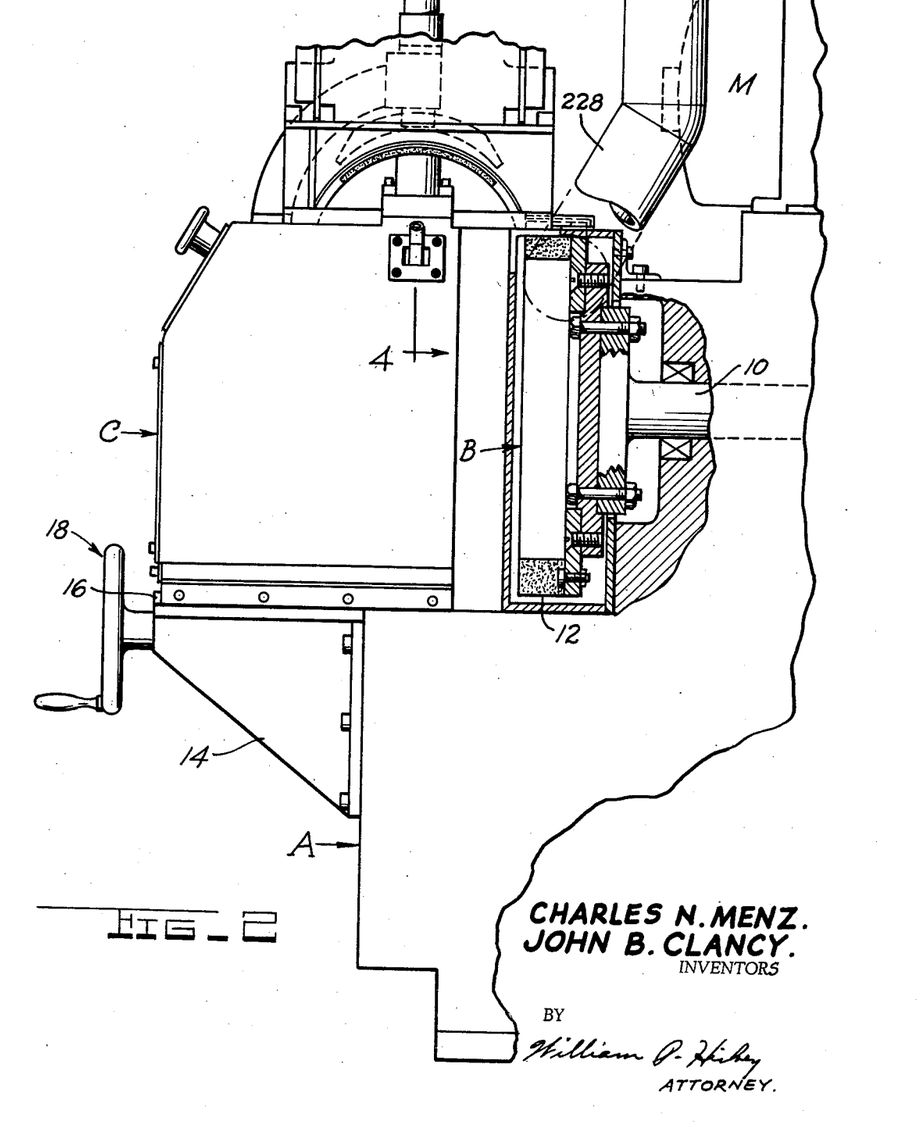
FIGURE 2 is a side elevational view of the machine shown in FIGURE 1 and includes right hand guard elements not seen in FIGURE 1—the figure further having a section broken away to better illustrate its grinding wheel and surrounding guard structure.

Aside from the elecrical control circuitry which makes the operation of the machine automatic, the machine is generally completed by means of guards that surround the grinding wheel 12 which have been omitted from certain views of the drawings to better show the internal workings of the machine, and further by a dressing tool 170 that is adapted to be periodically run across the front face of the grinding wheel 12 to true-up its machining surface. The dressing tool 170 is appropriately mounted on a cross slide 172 that is in turn carried by a support 174 mounted in forwardly and rearwardly extending guideways 176 that are positioned on the right side of the frame A of the machine. A suitable lead screw and hand wheel 178 are provided for moving the bracket 174 forwardly, while another lead screw and hand wheel 180 are provided for moving the cross slide 172 laterally with respect to the grinding wheel 12. The dressing tool 170 can be fed across the full width of the annular grinding wheel 12, and can further be adjusted to move the dressing tool rearwardly into the grinding wheel by any desired amount. As best seen in FIGURES 2 and 3 of the drawings, the annular grinding wheel 12 has an appreciable axial thickness; so that the wheel can be dressed a great number of times before the grinding wheel 12 need be replaced. It will further be seen that the physical arrangement of the machine is such that the same mechanism which adjusts the depth of chamfer can be used for the further purpose of adjusting for the wear of the grinding wheel 12 itself.

It will also be seen from FIGURES 3 and 4 of the drawings that each of the work support surfaces 28, the loading surface 30, and the inner surface of the pusher plate 32 are aligned and are of the same diameter as the diameter of the back side of the lining which is to be chamfered by the machine. It will further be seen that each of these surfaces 28, 30 and 32 are formed as the external surface of appropriate filler plates which can be easily removed and replaced with filler plates of a different diameter so as to handle a different diameter of brake lining. During change over, the pusher plate 32 is also replaced with one having the appropriate diameter; and it will further be seen that it also is mounted on a filler plate 50 which can be readily changed. No change to the basic machine therefore need be made during set-up of the machine; and all that need be done is to interchange three appropriate pieces for the work support, loading station, and pusher plates. One further modification must be made in that a holddown shoe 78 of the appropriate diameter must also be substituted at the time the change is made.

The grinding wheel 12 is made to have an appropriate radial thickness to accommodate the range and diameters of brake linings which the machine is intended to handle. By providing a suitable radial thickness to the grinding wheel 12, the same angle of taper can be provided on lining segments of the largest diameter that is provided on lining segments of the smallest diameter. This is accomplished by the same angular rotation of the work support D, by making an appropriate adjustment of the table C with respect to the outer face of the grinding wheel 12. The larger diameter grindings will thereby be caused to contact a point higher up on the grinding wheel 12, while the smaller diameter linings will contact the lower part of the face of the grinding wheel. The angle of chamfer which is provided by the machine can be appropriately adjusted by changing the amount of rocking action of the work support D. This is controlled by the hand wheel 160; and by appropriately moving the limit switch LS-4 away from the grinding wheel, a greater amount of rocking action is caused for the work support D. The depth of chamfer that is provided is adjusted by suitably positioning the table C relative to the front face of the grinding wheel, as will readily be understood.

While the present invention has been described as embodied in a machine which utilizes a grinding wheel to machine away a portion of the work pieces, it will readily be understood that any revolving machine tool having forwardly facing cutting edges can be used to similarly remove portions of the work pieces. It will be further understood that while the present invention has been described as embodied in a machine for chamfering the ends of work pieces such as brake linings, it can also be used to otherwise contour the ends of other types of work pieces, as well as to machine the work pieces to predetermined lengths.

Figure 8:
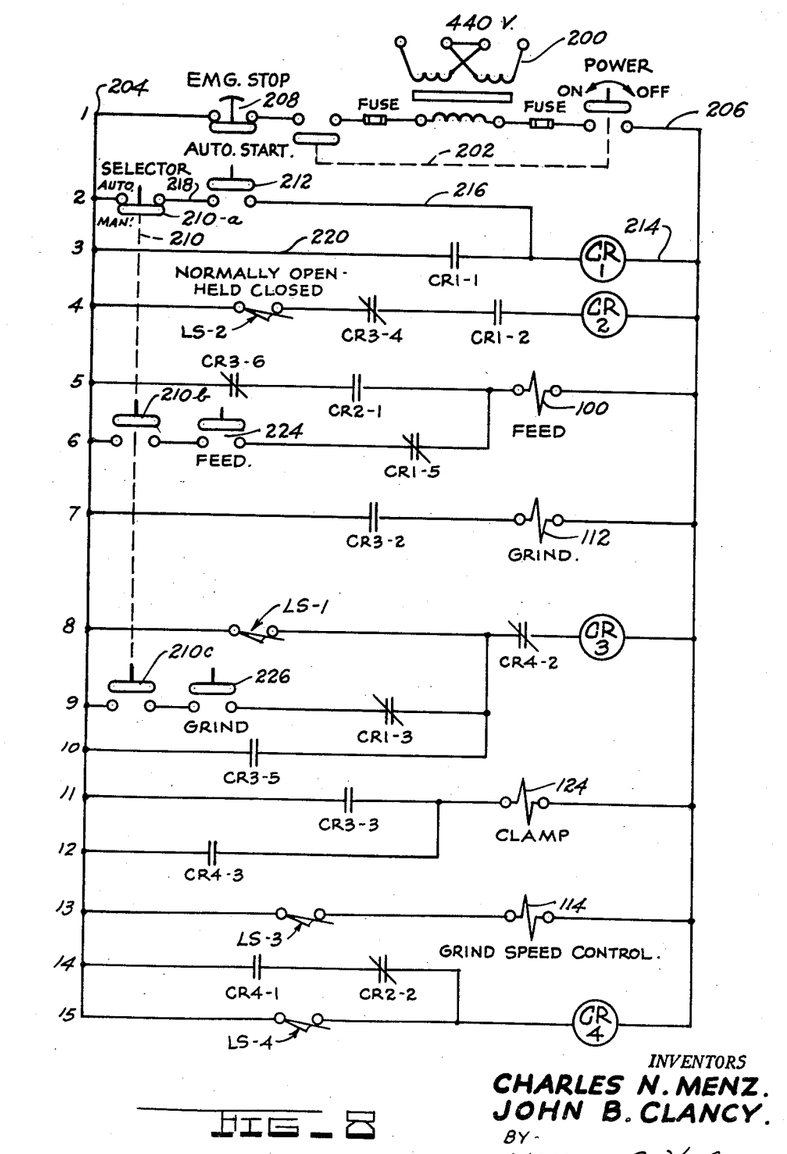
FIGURE 8 is a schematic wiring diagram that is used to control the actuation of the control elements seen in FIGURE 7, and which are shown physically throughout the remainder of the drawings.

The operation of the machine will now be described with reference to the wiring diagram shown in FIGURE 8 of the drawings. The power supply for the electrical control circuitry is obtained from the secondary winding of a 440 volt, 3-phase step down transformer 200, through appropriate fuses, to the separate sections of a double pole, double throw disconnect switch 202 to a pair of bus bars 204 and 206. An emergency stop button 208 is provided in the leads to one of these bus bars to completely open the circuit and stop the machine should this become necessary. A selector switch 210 is provided to control appropriate circuitry later to be described for the purpose of permitting either a manual stepwise operation of the machine, or a completely automatic one wherein the circuit portions which control the individual steps sequentially go through their cycle and immediately commence another cycle. In automatic operation, the cycles continue until either the emergency stop button 208 is opened, or the power switch 202 is opened.

Automatic cycling of the machine is started by pressing the automatic start button 212, which when the selector switch 210 is in its automatic position, closes a circuit between the bus bars 204 and 206 through control relay CR1. Energization of control relay CR1 initiates the following functions: it closes its normally open contacts CR1-1 to provide a holding circuit for the relay CR1; it closes the normally open contacts CR1-2 to energize the control relay CR2—provided that the work support D has returned to its vertical position, and the normally opened switch LS-2 has been closed by the dog 90; the normally closed contacts CR1-3 is opened in the manual energizing circuit for the grind relay CR3; and a normally closed switch CR1-5 is opened in the manual feed control circuit to the feed solenoid 100. The energizing circuit for the control relay CR1 comprises a wire 214 which connects one side of the relay to the bus bar 206; and the other terminal of the relay is connected to the automatic start button 212 by means of wire 216. The start button is connected to the contacts 210a of the selector switch 210 by means of the wire 218. The other terminal of the contacts 210 is suitably connected to the bus bar 204 to complete the circuit. The holding circuit for the relay CR1 comprises wire 220 which connects the bus bar 204 with one of the contacts CR1-1, while the other side of the contacts CR1-1 is connected to the relay CR1 through wire 216 to complete the circuit by means of wire 214 to the bus bar 206. The energizing circuit for the relay CR2 comprises the normally open switch LS-2, contacts CR3-4, later to be described, as well as the contacts CR1-2, previously mentioned, all arranged in series circuit with the relay CR2 between the bus bars 204 and 206.

If the work support D has returned to its normal vertical position, the switch LS-2 is closed, contacts CR3-4 are normally closed such that the closing of the contacts CR1-2 on the actuation of its solenoids CR1 energizes the control relay CR2. Energization of the control relay CR2 causes the following functions to be performed: it closes the contacts CR2-1 in the energizing circuit of the feed solenoid 100; and it opens normally closed contacts CR2-2 in the holding circuit for relay CR4 later to be described.

The energizing circuit for the feed solenoid 100 includes the now closed contacts CR2-1, and the normally closed contacts CR3-6 later to be described in series circuit between the bus bars 204 and 206. Actuation of the solenoid 100 causes the air motor 40 to in turn cause the pusher plate 32 to slide a lining segment upon the work support surface 28 of the work support D. At its outer limit of travel, the abutment 132 engages the roller 130 of the normally open limit switch LS-1 to close the energizing circuit to the control relay CR3.

The energizing circuit for the control relay CR3 includes the normally closed contacts CR4-2 and the limit switch LS-1 in series electrical circuit between the bus bars 204 and 206. Closing of the limit switch LS-1 therefore energizes the relays CR3 which thereupon produces the following functions: it opens its previously mentioned contacts CR3-4 in the energizing circuits for the relay CR2 to thereby again open the contacts CR2-1 in the energizing circuit to the feed solenoid 100 and thereby prevent another immediate feed cycle; it opens normally closed contacts CR3-6 to de-energize the circuit to the feed solenoid 100; it closes normally open contacts CR3-2 in the energizing circuit to the grind solenoid 112; it closes contacts CR3-5 in the hold circuit for the control relay CR3; and it closes its normally open contacts CR3-3 in the energizing circuit to the clamping solenoid 124.

The energizing circuit for the feed solenoid 100 includes the relay contacts CR3-6 and CR2-1 in electrical series circuit between the bus bars 204 and 206. The energizing circuit for the grind solenoid 112 contains the contacts CR3-2 in electrical series circuit between the bus bars 204 and 206. The holding circuit for relay CR3 includes the contacts CR3-5 and normally closed contacts CR4-2 later to be described in series electrical circuit between the bus bars 204 and 206. The holding circuit for the clamp solenoid 124 comprises the contacts CR3-3 in electrical series circuit between bus bars 204 and 206. The tripping of the relay CR3 therefore by the closing of the limit switch LS-1 causes the solenoid 124 to throw air pressure upon the top side of the air motor 86, and thereby clamp a lining segment down upon the support surface 28. With the rocking action previously described, the lining segment is forced firmly into engagement with the stop plate 76. Simultaneously therewith, control relay CR3 also energizes the grind solenoid 112 which throws air pressure on the bottom side of the air motor 64 to simultaneously rock the work support D toward the grinding wheel 12.

After a predetermined rocking action of the work support D, the dog 122 engages the roller of the limit switch LS-3 to close its contacts which are in series energizing circuit with the solenoid of the normally open solenoid valve 114. This closes valve 114 to cause the exhaust air from the top side of the air motor 64 to pass through the restriction 116 and thereby slow down the rocking atcion of the work support D. The limit switch LS-3 and solenoid 114 are of course in electrical series circuit between bus bars 204 and 206. The rocking action of the work support D however continues until the dog 90 engages the roller of the normally open limit switch LS-4 whose contacts are in electrical series circuit with the relay CR4 between the bus bars 204 and 206. Closing of the limit switch LS-4 therefore energizes relay CR4 which in turn closes its contacts CR4-1 in its holding circuit that includes the normally closed contacts CR2-2. The holding circuit for the relay CR4 contains the contacts CR4-1 and CR2-2 in electrical series circuit with the relay CR4 between the bus bars 204 and 206. Energization of the relay CR4 also closes its contacts CR4-3 which is in a second holding circuit for the clamp solenoid 124 that parallels the contacts CR3-3. Energization of the control relay CR4 performs the further functions of opening its normally closed contacts CR4-2 in the energizing circuit for the relay CR3 to drop out the relay CR3 and thereby deenergize clamping solenoid 124 and the grinding solenoid 112. Deenergization of the control relay CR3 therefore causes the contacts CR3-3 to open the energizing circuit which they provide for the clamping relay 124, but the parallel holding circuit CR4-3 picks up this function to continue energization of the clamping relay 124 as the work support D returns to its vertical position. The limit switch LS-4 however is only held closed by the dog 90 during the time that the lining segment is in engagement with the grinding wheel 12; so that shortly after the work support D moves a short distance back towards its vertical position, it again opens to open its contacts CR4-3 in the parallel energizing circuit for the clamp relay 124 to thereby open the solenoid valve 124 and allow the air motor 86 to be spring biased to its upper position wherein the clamp shoe 78 moves out of engagement with the lining segment L. By the time that the work support D reaches its normal position, the lining segment L is completely unclamped so that when the dog 90 again engages the limit switch LS-2, the control relay CR2 is again energized to initiate another feed cycle. Energizing of the relay CR2 again closes its contacts CR2-1 in the energizing circuit for the feed solenoid 100 to automatically initiate another cycle of the machine.

As previously indicated, manual operation of the machine can be had by moving the selector switch 210 to its manual position wherein its contacts 210a are opened and its contacts 210b and 210c are closed. As previously mentioned, contacts 210a are in the automatic start circuit provided by the switch 212 for the initial energization of the relay CR1 so that with the contacts 210a open, relay CR1 cannot be energized. Inasmuch as relay CR1 cannot be energized, its contacts CR1-2 will not be closed to energize the control relay CR2 which in turn causes an automatic energization of the feed solenoid 100 whenever the limit switch LS-2 is closed by the dog 90.

A manual feed energizing circuit is provided for the feed solenoid 100 by an electrical series circuit between the bus bars 204, 206 which includes the contacts 210b, manual feed switch 224 and normally closed contacts CR1-5—which since relay CR1 is not energized, will remain closed. By holding the feed button 224 down, the solenoid 100 is energized to cause the air motor 40 to move the pusher plate 32 forwardly until its contacts normally open limit switch LS-1. Closing of the limit switch LS-1 energizes relay CR3 to close contact CR3-5 in its holding circuit as well as its clamping contact CR3-3 in the energizing circuit to solenoid 124. Thereafter the work support E is tilted to sequentially cause its dog 122 to close the limit switch LS-3 and slow down the rocking action and thereafter produce the actual grinding operation until the limit switch LS-4 is closed. Thereafter, contacts CR4-1 close its holding circuit; the contacts CR4-3 are closed in the parallel energizing circuit for clamp solenoid 124; and the contacts CR4-2 are opened in the energizing circuit for relay CR3 to thereby drop out this relay. The energizing circuit for the grind solenoid 110 is thereby deenergized, and the work support D rocks back into its normal position. Inasmuch as the control relay CR1 is not energized, its contacts in the cycling relay CR2 remain open so that the closing of the limit switch LS-2 does not produce a re-cycling of the machine when the work support D reaches its normal position.

A separate manual energizing circuit for the relay CR3 is provided by the contacts 210c of the selector switch, closed contacts CR1–3 and CR4–2, and a manual normally open grind switch 226. It is therefore possible when the manual selector switch 210 is put in its manual position, to press the manual grind button 226 and energize control relay CR3 to cause simultaneously energization of the clamping solenoid 124, and the grind solenoid 112. Energization of the grinding solenoid 112 produces a rocking action of the work support D. After a predetermined rocking action the limit switch LS–3 is closed to slow down the rocking speed and produce the actual grinding operation. At the finish of the grinding operation the limit switch LS–4 is closed to energize the relay CR4, drop out the relay CR3, and causes the work support D to move back into its normal position. Inasmuch as only the manual grind button 226 has been pressed, the closing of the limit switch LS–2 does not produce an automatic feed cycle when the work support reaches its normal position. Neither will it produce an energization of the feed solenoid 100 to place a new segment into the machine. The cycle therefore automatically stops when the work support D reaches its normal position.

Figure 1:
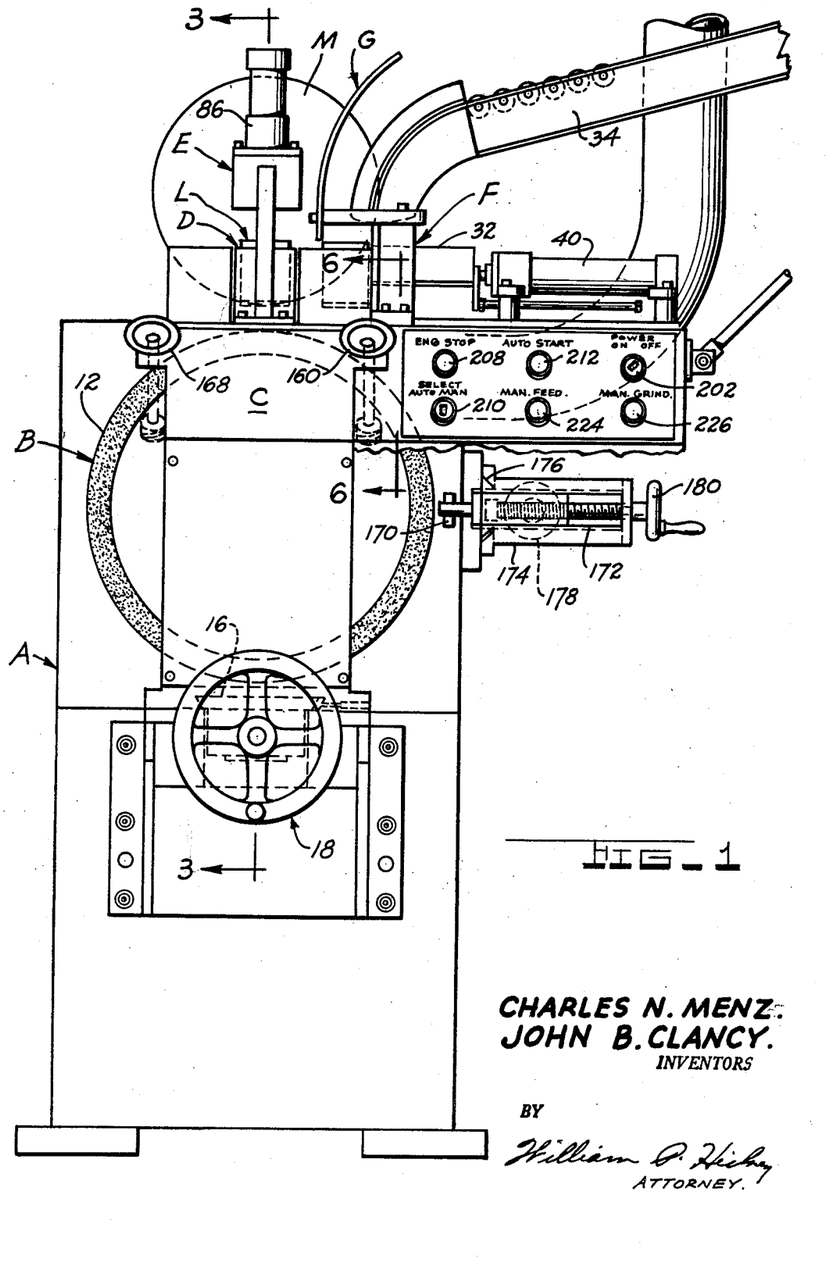
FIGURE 1 is a front elevational view of a machine designed to chamfer the ends of arcuate sections of brake lining, and in which sections of the guards on the left and right sides of the machine and which are normally used to cover the grinding wheel have been removed to better illustrate the functional elements of the machine.

All of the manually actuated switches 202, 208, 210, 212, 224 and 226 are grouped together in a control panel that is physically located on a bracket projection from the right hand side of the table C (as best seen in FIGURE 1). The machine may further include a vacuum dust line 228 for the purpose of sucking away the ground pieces of brake lining that are produced by the grinding wheel 12; and the machine will also include a motor M which is suitably connected to the shaft 10 by means of a suitable mechanical drive connection to rotate the grinding wheel 12 at a predetermined speed.

It will be apparent that the objects heretofore enumerated as well as others have been accomplished; and that there has been provided a new and improved machine for accurately machining the ends of strip material, be it arcuately shaped or otherwise, to substantially any desired depth or angle of cut on a variety of sizes. The machine can be changed over from machining one size of work piece to another by making only a few adjustments. It will be seen that many of these advantages stem from the type of rocking action and orientation of the machine elements that are used for transferring the work pieces up against the end surface of a revolving machine tool.

While the invention has been described in considerable detail, we do not wish to be limited to the particular embodiment shown and described and it is our intention to cover hereby all novel adaptations, modifications, and arrangements thereof which come within the practice of those skilled in the art to which the invention relates.

We claim:

1. A machine for machining the ends of work pieces and comprising: a frame having a horizontal forwardly extending rotatable shaft; a revolving work forming tool fastened to and rotated by said shaft, said work forming tool having forwardly extending cutting edges which move along a surface of revolution; a table movably mounted on said frame forwardly of said surface of revolution for movement toward and away from said surface of revolution; a tilt shaft mounted on said table forwardly and generally normal to the horizontal plane passing through the axis of revolution of said machining edges; a work support fastened to said tilt shaft for arcuate movement toward and away from said surface of revolution of said cutting edges, said support having a work supporting surface on which the work pieces are to be accurately positioned; stop means against which said work pieces are to be positioned when said work pieces are accurately located on said work supporting surface; means for individually placing work pieces on said work supporting surface to one side of said stop means; a clamp member normally positioned above said work supporting surface; a movable support for moving said clamp member toward and away from said work supporting surface, said clamp member being pivotally supported by said movable support on an axis positioned to said one side of said stop means and generally parallel to said work supporting surface; the portion of said member between said axis and said stop means being yieldably biased towards said work supporting surface and being arranged to contact a work piece thereon before the portion of said clamp member on the opposite side of said axis contacts said work piece during movement of said clamp member toward said work support; means for adjusting the position of said table predetermined distances away from said imaginary surface of revolution of said cutting edges; and means for rotating said tilt shaft to bring a work piece located on said support by said stop means against said rotating cutting edges.

2. In a machine for machining work pieces: a frame; a work forming tool mounted on said frame; a work support mounted on said frame for movement toward and away from said frame, said support having a work supporting surface on which the work pieces are to be accurately positioned; stop means against which said work pieces are to be positioned when said work pieces are accurately located on said work supporting surface; means for individually placing work pieces on said work supporting surface to one side of said stop means; a clamp member normally positioned above said work supporting surface; a movable support for moving said clamp member toward and away from said work supporting surface; said clamp member being pivotally supported by said movable support on an axis positioned to said one side of said stop means and generally parallel to said work supporting surface, the portion of said clamp member between said axis and said stop means being yieldably biased toward said work supporting surface and being arranged to contact a work piece thereon before the portion of said clamp member on the opposite side of said axis contacts said work piece; and whereby the work pieces are automatically moved against said stop means by pivotal action of said clamp member as it clamps a work piece against said work supporting surface.

3. In a machine for machining the ends of work pieces comprising: a frame; a work forming tool rotatably mounted in said frame, said tool having cutting edges which are revolved in a generally vertically extending surface of revolution; a work support positioned for movement toward and away from said surface of revolution; stop means against which said work pieces are to be positioned when said work pieces are accurately located on said work supporting surface; means for individually placing work pieces on said work supporting surface to one side of said stop means; a clamp member normally positioned above said work supporting surface; a movable support for moving said clamp member toward and away from said work supporting surface, said clamp member being pivotally supported by said movable support on an axis positioned to said one side of said stop means and generally parallel to said work supporting surface; the portion of said clamp member between said axis and stop means being yieldably biased toward said work supporting surface and being arranged to contact a work piece thereon before the portion of said clamp member on the opposite side of said axis contacts said work piece during movement of said clamp member toward said work support; and means effecting movement of said work support to a predetermined position toward said surface of revolution of said work forming tool.

4. A machine for machining the ends of work pieces comprising: a frame having a horizontal forwardly extending rotatable shaft projecting therefrom; forwardly facing work cutting edges carried by said shaft and rotated along a cutting path forming a surface of revolution; a table movably mounted on said frame forwardly of said path of said cutting edges for positioning toward and away from said path of said cutting edges; a tilt shaft mounted on said table forwardly of and extending generally parallel to said path of said cutting edges; a work support fastened to said tilt shaft for arcuate movement from a normal upright position toward said path of said cutting edges; said work support having a work supporting upper surface, said table having a stationary loading surface positioned laterally of work supporting surface in the direction parallel with said tilt shaft and in line with said work supporting surface; magazine means for stacking work pieces on said loading surface; pusher means for sliding an individual work piece off of said loading surface onto said work supporting surface; holddown means for clamping a work piece in a predetermined location on said work supporting surface; and feed means for rocking said tilt shaft to a generally predetermined relationship with respect to said path of said cutting edges.

5. A machine for automatically machining the ends of work pieces comprising: a frame having a horizontal forwardly extending rotatable shaft projecting therefrom; forwardly facing work cutting edges carried by said shaft and rotated along a cutting path forming a surface of revolution; a table movably mounted on said frame forwardly of said path of said cutting edges for positioning toward and away from said path of said cutting edges; a tilt shaft mounted on said table forwardly of and extending generally parallel to said path of said cutting edges; a work support fastened to said tilt shaft for arcuate movement from a normal upright position toward said path of said cutting edges; said work support having a work supporting upper surface, said table having a stationary loading surface positioned laterally of work supporting surface in the direction parallel with said tilt shaft and in line with said work supporting surface; magazine means for stacking work pieces on said loading surface; pusher means for sliding an individual work piece off of said loading surface onto said work supporting surface; holddown means for clamping a work piece in a predetermined location on said work supporting surface; feed means for rocking said tilt shaft to a generally predetermined relationship with respect to said path of said cutting edges; first control means actuated by the positioning of a work piece on said work supporting surface by said pusher means for initiating actuation of said holddown means and said feed means; second control means actuated upon the rocking of said work support to a predetermined position wherein a generally predetermined amount of machining has been accomplished on said work pieces by said cutting edges for initiating a return of said work support to its normal position; and third control means responsive to the return of said work support to its normal position for initiating actuation of said pusher means to slide a new work piece on said work support and in turn force the machined work piece out of said machine; and whereby said machine automatically functions to sequentially machine work pieces placed in said magazine means.

References Cited in the file of this patent
UNITED STATES PATENTS

| | | |
|---|---|---|
| 267,574 | Mundell et al. | Nov. 14, 1882 |
| 2,304,530 | Bigelow | Dec. 8, 1942 |
| 2,325,826 | Barrett | Aug. 3, 1943 |
| 2,328,650 | Johnson et al. | Sept. 7, 1943 |
| 2,421,180 | Barrett | May 27, 1947 |
| 2,916,856 | Olofson | Dec. 15, 1959 |
| 2,982,058 | Maitenaz | May 2, 1961 |